United States Patent [19]

Enge et al.

[11] Patent Number: 5,745,075
[45] Date of Patent: Apr. 28, 1998

[54] MULTI-TONE DGPS BEACON TRANSMITTER AND RECEIVER

[75] Inventors: Per K. Enge, Mountain View; David W. Young, Santa Cruz, both of Calif.

[73] Assignee: Trimble Navigation Limited, Sunnyvale, Calif.

[21] Appl. No.: 658,484

[22] Filed: Jun. 5, 1996

[51] Int. Cl.⁶ .............. H04B 7/00; H04B 1/00; H04B 1/10; G01S 5/02
[52] U.S. Cl. .............. 342/367; 342/357; 455/59; 455/65
[58] Field of Search .............. 342/357, 353, 342/367, 352; 455/59, 65

[56] References Cited

U.S. PATENT DOCUMENTS

| | | |
|---|---|---|
| 2,278,779 | 4/1942 | Hansell .............. 455/42 |
| 3,361,970 | 1/1968 | Magnuski .............. 455/59 |
| 4,628,517 | 12/1986 | Schwarz et al. .............. 455/59 |

OTHER PUBLICATIONS

Beser et al., "The Application of Navstar Differential GPS in the Civilian Community", Navigation, vol. II, 1984, pp. 167–196.

Primary Examiner—Gregory C. Issing
Attorney, Agent, or Firm—David R. Gildea

[57] ABSTRACT

An apparatus and a method for transmitting and receiving a signal having multiple tones for obviating destructive interference between a groundwave and a skywave of the signal. The multiple tones have a frequency offset that is calculated so that the destructive interference nulls for each of the tones occurs at different range distances from the transmitter thereby extending the distance over which at least one of the tones can be reliably received.

36 Claims, 6 Drawing Sheets

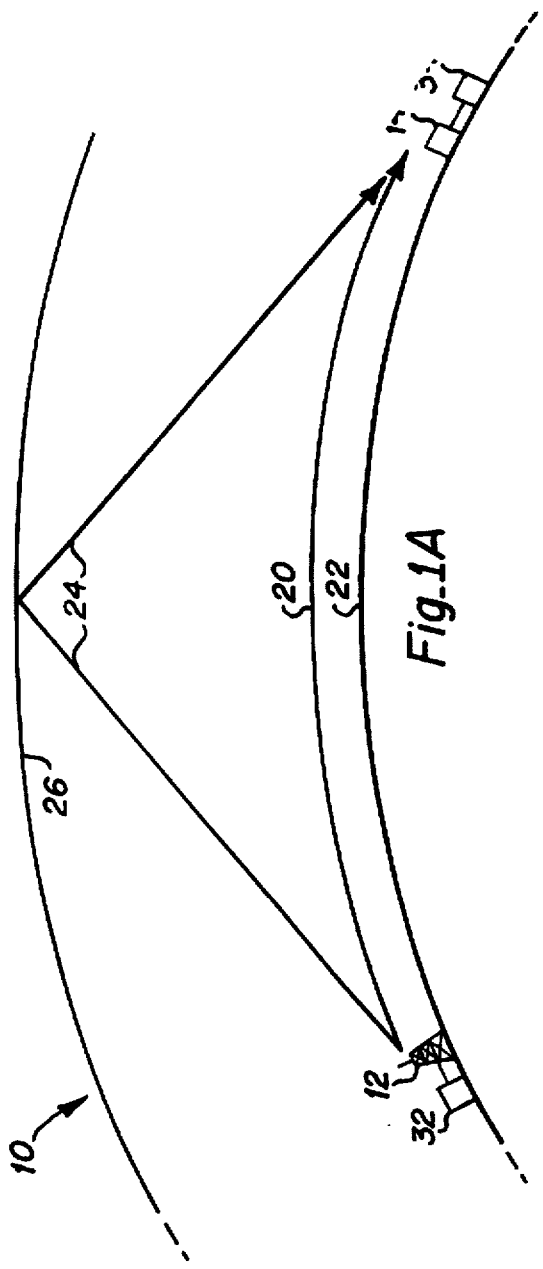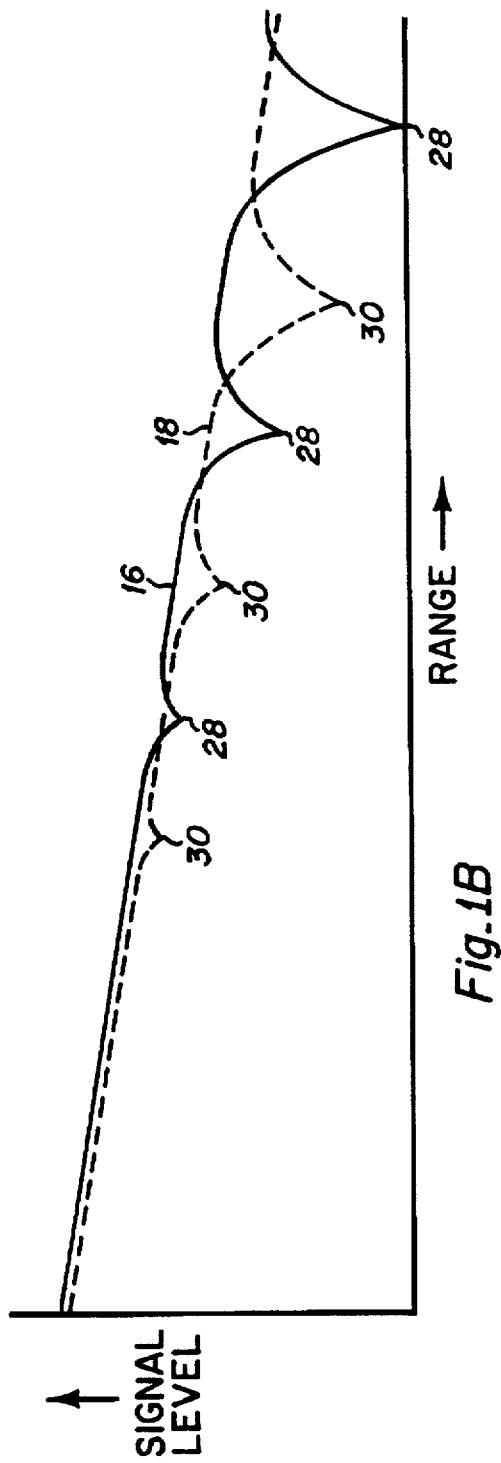

MULTI-TONE DGPS BEACON TRANSMITTER AND RECEIVER

BACKGROUND OF THE INVENTION

1. Field of the Invention

The invention relates generally to radio systems using multiple tones and more particularly to a differential global positioning system (DGPS) beacon transmitter and a DGPS beacon receiver using multiple tones having a frequency offset calculated to obviate destructive interference between a skywave and a groundwave.

2. Description of the Prior Art

It is well known that a low frequency radio signal travels both as a groundwave along the surface of the Earth and as a skywave by reflecting back to Earth from the ionosphere. A receiver tuned to receive the radio signal receives a vector sum of the groundwave plus the skywave. The path length of the skywave to travel up to the ionosphere, reflect from the ionosphere, and travel back to the Earth is longer than the path length of the groundwave. Furthermore, the difference in the path lengths varies as a function of range from the transmitter. The vector sum will have either destructive interference when the groundwave and the skywave are approximately out-of-phase or constructive interference (reinforcement) when the groundwave and the skywave are approximately in-phase in an alternating fashion as the range increases. When the range is small, the groundwave has a much higher signal level than the skywave so the effect of the interference is small. As the range increases, the groundwave signal level decreases while the skywave signal level increases resulting in pronounced destructive interference nulls at certain range distances that prevent the radio signal from being received. The specific range distances where the destructive interference nulls occur depends upon the carrier frequency of the radio signal.

The global positioning system (GPS) is used in many applications for providing a GPS-based geographical location of a GPS receiver. The accuracy of the GPS-based location may be improved with the use of differential global position system (DGPS) corrections. Marine beacon stations are located near to coast lines throughout the world for broadcasting marine beacon signals at carrier frequencies each 0.5 kilohertz in a range of 283.5 kilohertz to 325 kilohertz. Many of these marine beacon stations have been equipped as DGPS beacon transmitters to broadcast the DGPS corrections in a DGPS signal. Such DGPS beacon transmitters are being operated or being considered by virtually every country with a coast line. Among the countries currently operating DGPS beacon transmitters are: Australia, Bermuda, Brazil, Canada, China, Denmark, Estonia, Finland, Germany, Hong Kong, Iceland, Ireland, Italy, Netherlands, Norway, Poland, Russia, Sarawak, Sweden, Thailand, United Kingdom, United States, and Venezuela. Several other countries including Japan are actively testing and are expected to begin operating DGPS beacon transmitters soon. Unfortunately, the reliable range for receiving the DGPS signal is limited to about 150 to 250 kilometers. At ranges greater than about 150 to 250 kilometers, destructive interference between a skywave and a groundwave of the DGPS signal reduces the reliability of being able to receive the DGPS corrections.

Several techniques using frequency diversity are known for obviating the effect of multipath destructive interference such as may be caused by a skywave interfering with a groundwave. However, the known techniques are relatively complex and would require extensive changes to existing DGPS beacon transmitters, not allow for continued operation of existing DGPS beacon receivers, and/or require many frequency tones in order to obtain a significant increase in the reliable range of the DGPS signal.

There is a need for a DGPS beacon transmitter and a DGPS beacon receiver for transmitting and receiving a DGPS signal having an extended reliable range without requiring extensive modifications to existing DGPS transmitters and DGPS receivers.

SUMMARY OF THE INVENTION

It is therefore an object of the present invention to provide a radio transmitter and a method for extending the reliable range for transmitting a radio signal by transmitting two or more signals having a frequency offset that is calculated so that at a range where there is destructive interference between a groundwave and a skywave from a first signal, there is reinforcement between the groundwave and the skywave from a second signal.

Another object is to provide a radio receiver and a method for tuning to two or more signals having a frequency offset in order to improve the reliability of receiving at least one of the signals.

Another object is to provide a differential global positioning system (DGPS) beacon transmitter and method for transmitting two or more DGPS signals having a frequency offset that is calculated so that at a range where there is destructive interference between a groundwave and a skywave from a first signal, there is reinforcement between a groundwave and a skywave from a second signal.

Another object is to provide a DGPS beacon receiver and method for tuning to two or more signals having a frequency offset in order to improve the reliability of receiving at least one of the signals.

Another object is to provide a DGPS beacon transmitter for transmitting two or more signals where one of the signals is a standard DGPS signal.

Briefly, in a preferred embodiment, a differential global positioning system (DGPS) beacon transmitter includes a first signal generator for providing a first DGPS signal by modulating information for the DGPS corrections on a first carrier frequency, a second signal generator for providing a second DGPS signal by modulating information for the DGPS corrections on a second carrier frequency, and a transmit section for amplifying and transmitting the modulated signals. The DGPS corrections are provided by a DGPS reference receiver. The frequency offset between the first and second carrier frequencies is determined beforehand or based upon current conditions so that the groundwave and the skywave from the second DGPS signal reinforce at range distances where the groundwave and the skywave from the first DGPS signal destructively interfere over a range of about 150 to 600 kilometers from the transmitter. A DGPS beacon receiver in a preferred embodiment includes a tuner for tuning to the first and second DGPS signals and a microprocessor system for controlling the tuner and recovering the DGPS corrections. A GPS receiver uses the DGPS corrections for calculating a differentially corrected GPS-based geographical location.

An advantage of the present invention is that it provides a radio transmitter and a method for extending the effective distance for transmitting a signal in the presence of a groundwave and a skywave.

Another advantage of the present invention is that it provides a radio receiver and a method for extending the effective distance for receiving a signal in the presence of a groundwave and a skywave.

Another advantage of the present invention is that it provides a differential global positioning system (DGPS) beacon transmitter and a method for extending the distance for transmitting DGPS corrections to a GPS receiver.

Another advantage of the present invention is that it provides a DGPS beacon receiver and a method for extending the distance for receiving DGPS corrections from a DGPS transmitter.

Another advantage of the present invention is that existing DGPS beacon receivers will continue to be useful by being able to receive the DGPS signal at a standard beacon frequency.

These and other objects and advantages of the present invention will no doubt become obvious to those of ordinary skill in the art after having read the following detailed description of the preferred embodiments which are illustrated in the various figures.

IN THE DRAWINGS

FIGS. 1a and 1b are signal path and signal level views, respectively, for a multi-tone radio system having a differential global positioning system (DGPS) beacon transmitter of the present invention for transmitting to a DGPS beacon receiver of the present invention;

Figure 3A:
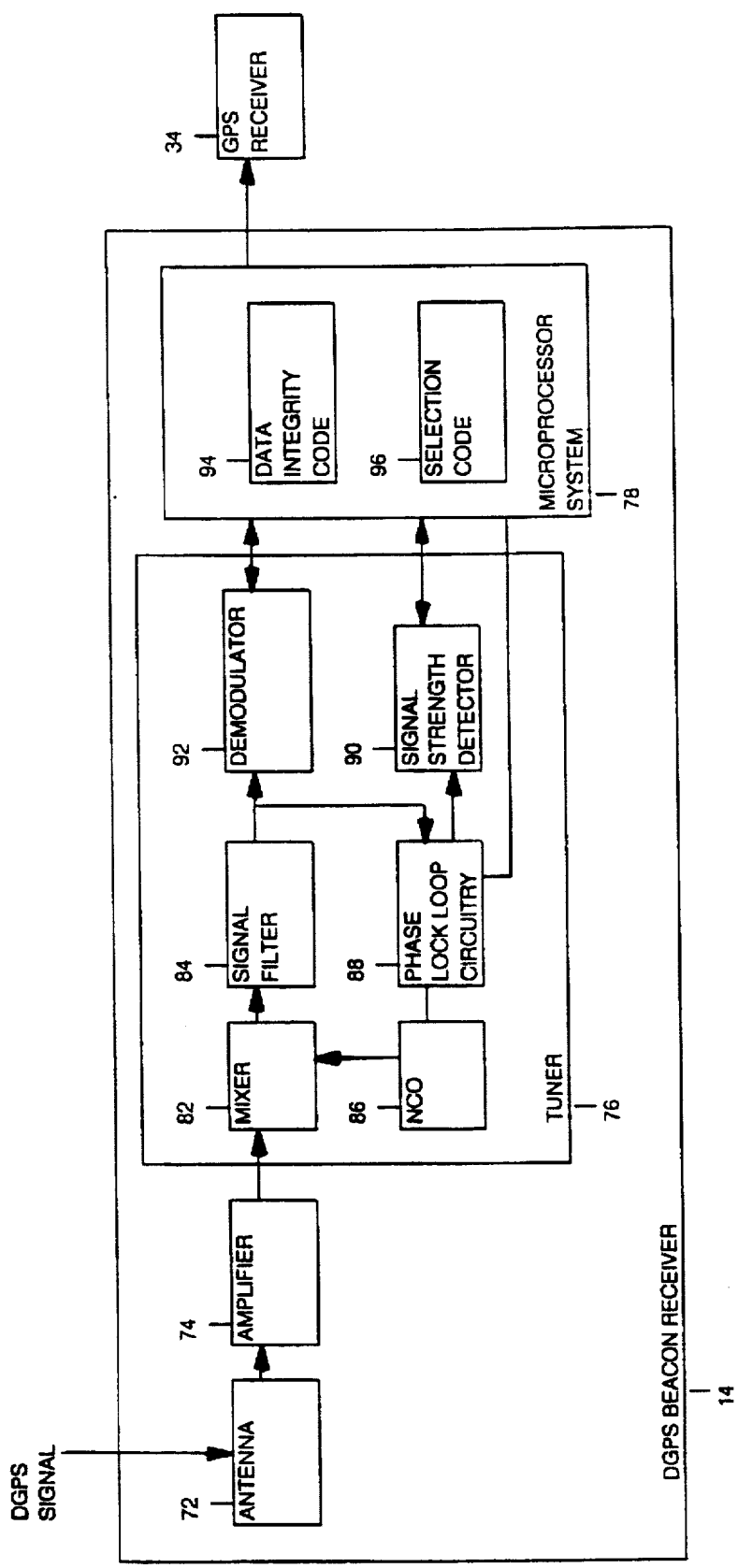
Figure 3B:
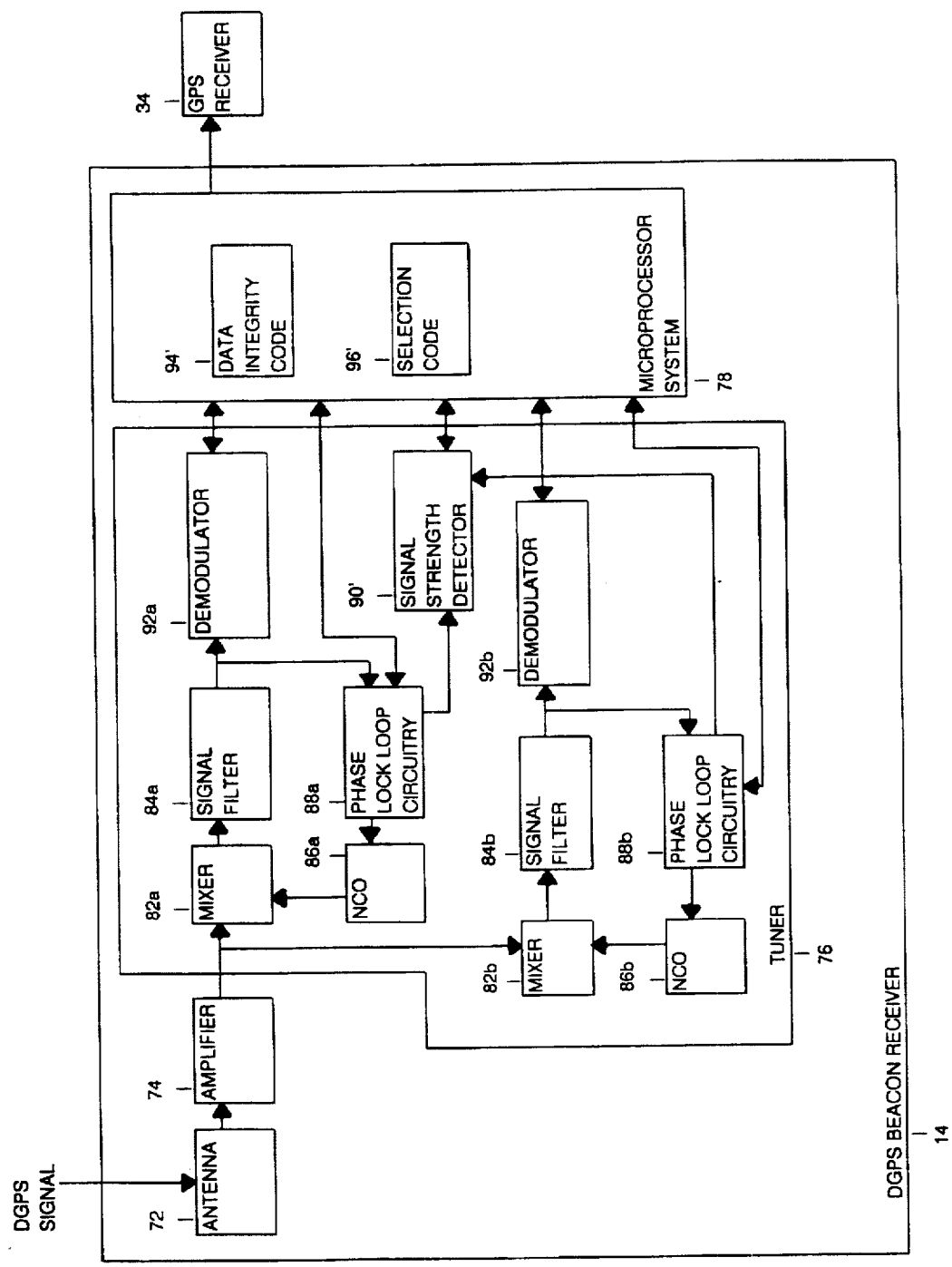
Figure 3C:
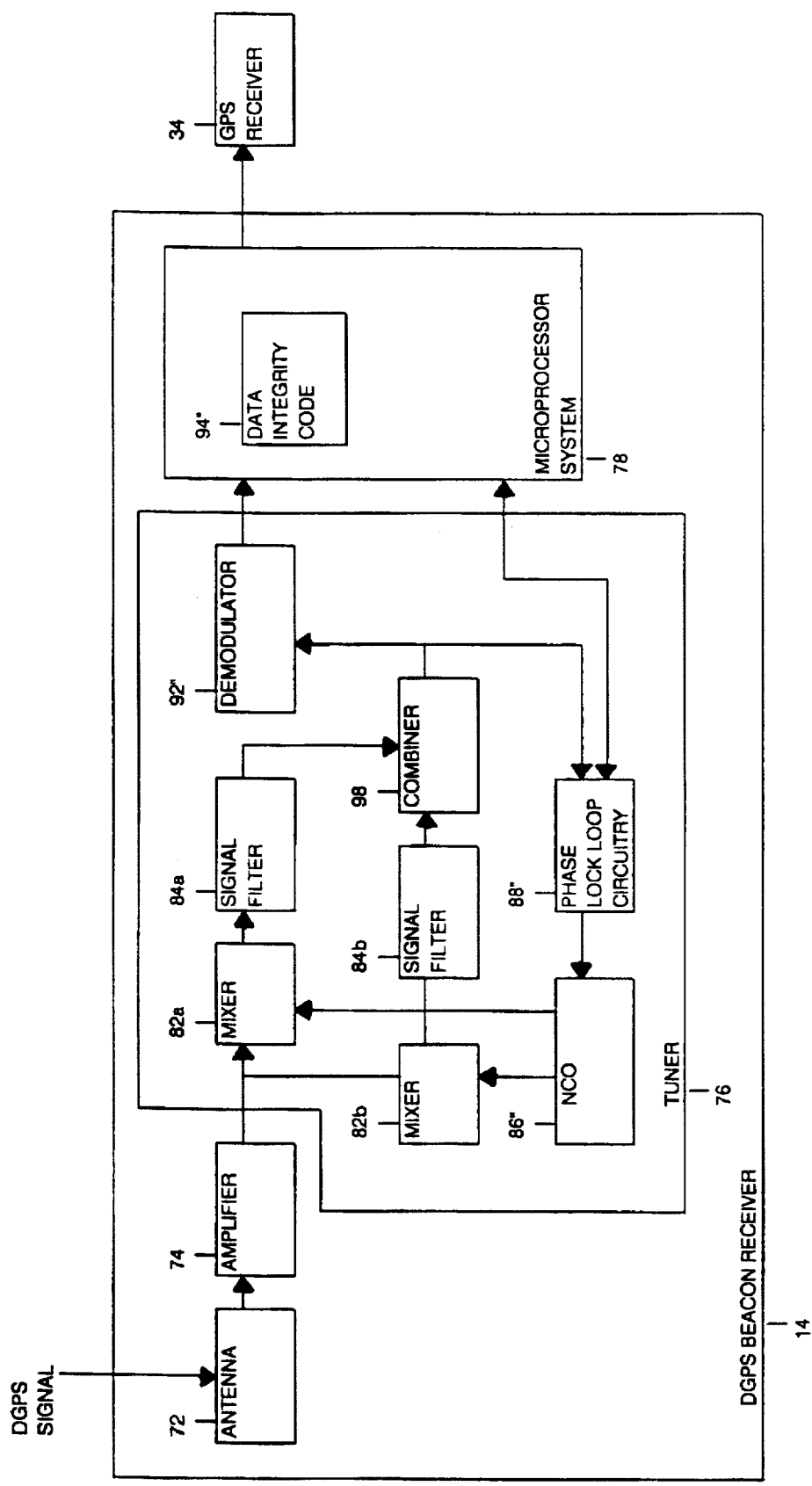
Figure 4:
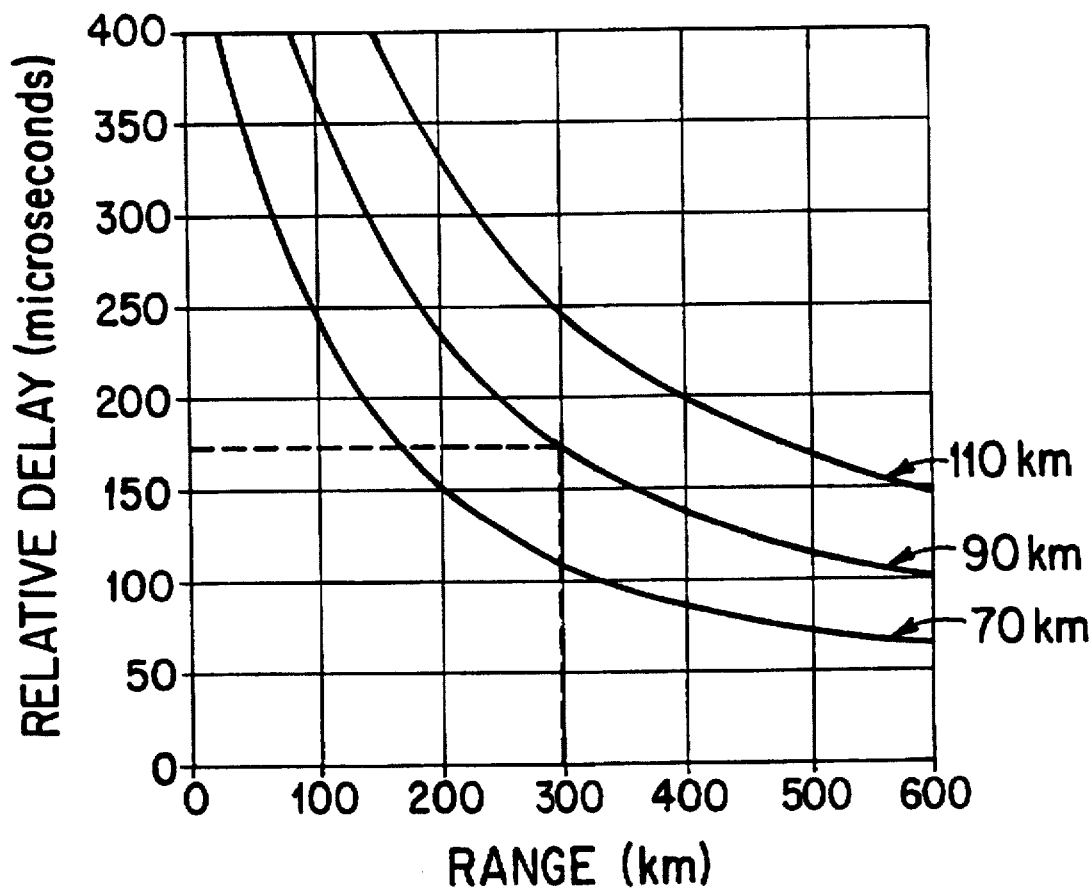

FIGS. 3a, 3b, and 3c are block diagrams of embodiments of the DGPS beacon receiver of FIG. 1; and FIG. 4 is a chart of relative delay between a skywave and a groundwave versus range between the DGPS beacon transmitter of FIG. 1 and the DGPS beacon receiver of FIG. 1.

DETAILED DESCRIPTION OF THE PREFERRED EMBODIMENTS

FIGS. 1a and 1b illustrate signal path and signal level views, respectively, of a multi-tone radio system referred to by the general reference number 10. The system 10 includes a differential global positioning system (DGPS) beacon transmitter 12 for transmitting a multi-tone DGPS signal including DGPS corrections and a DGPS beacon receiver 14 for receiving the multi-tone DGPS signal and recovering the DGPS corrections. The DGPS signal is transmitted as a standard DGPS signal and an offset DGPS signal. The standard and offset DGPS signals have a standard and an offset carrier frequency, respectively, that differ by a frequency offset. Information for the standard DGPS signal may be obtained from the Maritime Administrations of the countries listed above that operate DGPS beacon transmitters and from the following sources: 1.) the International Telecommunications Union (ITU) in Geneva, Switzerland, in a document entitled "Technical Characteristics of Differential Transmissions for Global Navigation Satellite Systems (GNSS) from Maritime Radio Beacons in the Frequency Band 285 to 325 kilohertz (283.5 to 315 kilohertz in Region 1) ITU-RM823(Draft)"; 2.) the United States Coast Guard in Washington, D.C., in a document entitled "Broadcast Standard for the USCG DGPS Navigation Service, COMDTINST M16577.1" published in April, 1993; 3.) the Russian Ministry of Defense, Department of Navigation and Oceanography, Lighthouse Service of HDoNoMD in Moscow, Russia, in a document entitled "Broadcast Standard for Russian DGPS/DGLONASS"; and 4.) the Radio Technical Commission for Maritime Services, in Washington, D.C., in a document entitled "RTCM Recommended Standards for Differential Navstar GPS Service, Version 2.2, RTCM Special Committee No. 104".

The DGPS beacon receiver 14 receives the standard and offset DGPS signals at a standard signal level 16 and an offset signal level 18, respectively, that are each a vector sum of a groundwave 20 following the curvature of the Earth 22 and a skywave 24 reflecting from the ionosphere 26. Because the difference in the path lengths of the groundwave 20 and the skywave 24 varies as a function of range from the transmitter 12, destructive interference occurs at certain ranges. The standard DGPS signal has destructive interference at range distances 28 depending upon the height of the ionosphere 26 and the standard carrier frequency. Similarly, the offset DGPS signal has destructive interference nulls at range distances 30 depending upon the height of the ionosphere 26 and the offset carrier frequency. The frequency offset is pre-determined or calculated in the DGPS beacon transmitter 12 in order to stagger the range distances 28 from the range distances 30 so that at least one of the standard signal level 16 and the offset signal level 18 is strong enough to be received by the DGPS beacon receiver 14 for recovering the DGPS corrections.

The DGPS corrections are computed by a DGPS reference receiver 32 having a known geographical location by comparing the known location to a location derived from the global positioning system (GPS). A GPS receiver 34 that is coupled to the DGPS beacon receiver 14 uses the DGPS corrections for improving the accuracy of a GPS-derived geographical location for the GPS receiver 34.

Figure 2:
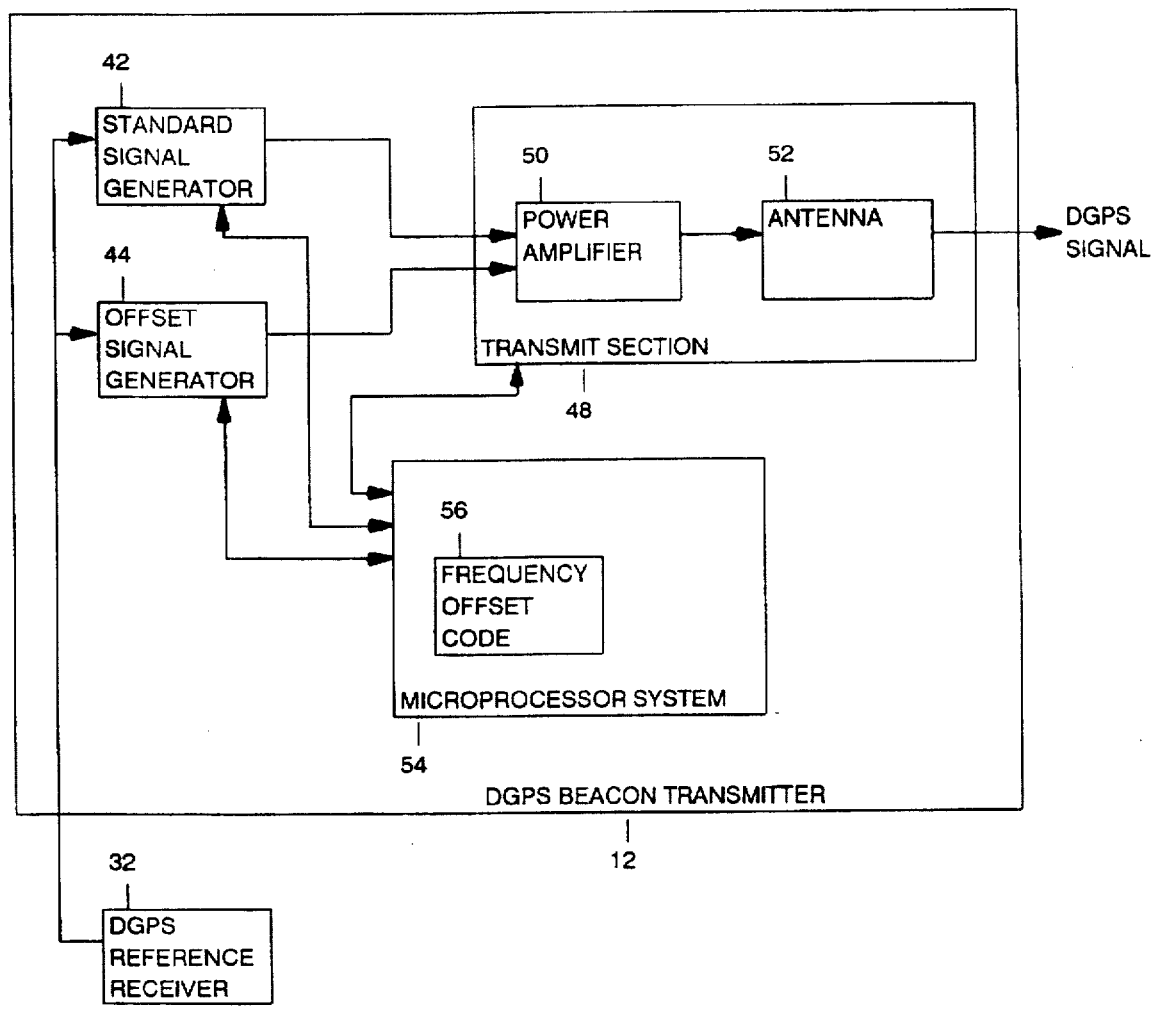
FIG. 2 is a block diagram of the DGPS beacon transmitter of FIG. 1.

FIG. 2 illustrates a block diagram of the DGPS beacon transmitter 12 of the present invention. The DGPS beacon transmitter 12 includes a standard signal generator 42 for providing the standard DGPS signal by modulating DGPS correction information received from the DGPS reference receiver 32 onto the standard carrier frequency. The DGPS reference receiver 32, including a GPS antenna for receiving a GPS satellite signal, calculates the DGPS corrections from a difference between the geographical location or pseudoranges derived from a global positioning system (GPS) satellite signal received by the GPS antenna and the geographical location of a known location of the GPS antenna or the pseudoranges that would be derived if the GPS antenna were at the known location. The DGPS beacon transmitter 12 further includes an offset signal generator 44 for providing the offset DGPS signal by modulating the DGPS correction information receiving from the DGPS reference receiver 32 onto the offset carrier frequency. A transmit section 48 includes a power amplifier 50 to combine and amplify the standard and offset DGPS signals and an antenna 52 to radiate the standard and offset DGPS signals as an radio wave. A microprocessor system 54 includes a memory including an executable code. The executable code includes a frequency offset code 56 for storing a pre-determined value for the frequency offset between the standard and the offset carrier frequency. Alternatively, the frequency offset code 56 may include a code for calculating the frequency offset based upon information for the current or predicted height of the ionosphere or other factors such as the time of day, the day of the year, or solar activity.

FIGS. 3a, 3b, and 3c are block diagrams of three preferred embodiments of the DGPS beacon receiver 14 of the present invention including an antenna 72, an amplifier 74, a tuner 76, and a microprocessor system 78. The antenna 72 receives the radio wave standard and offset DGPS signals and converts them into conducted electrical DGPS signals. The amplifier 74 includes a low noise amplifier for amplifying the DGPS signal, a radio frequency filter for filtering signals that are outside the frequency band of the DGPS signals, and a quantizer for converting the DGPS signal from an analog to a digital form. One or more frequency conversions may also be included. The quantizer may be a limiter providing one bit digitization or an analog to digital converter providing two or more bits. The tuner 76 receives the digital DGPS signals, tunes to the standard and/or the offset DGPS frequency, and provides a tuner output signal to the microprocessor system 78. The microprocessor system 78 includes a memory including an executable code for instructing the microprocessor system 78 for controlling the tuner 76. The tuner 76 and the microprocessor system 78 cooperate for recovering the DGPS corrections.

In a preferred embodiment, the tuner 76 uses a commercially available digital signal processing chip such as a TMS 320 from Texas Instruments.

The FIG. 3a illustrates an embodiment of the DGPS beacon receiver 14 wherein the tuner 76 is a single channel receiver including a mixer 82, a signal filter 84, a numerically controlled oscillator (NCO) 86, phase lock loop circuitry 88, an optional signal strength detector 90, and a demodulator 92. The NCO 86 provides a local oscillator (LO) signal to the mixer 82. The mixer 82 multiplies the digital DGPS signal and the LO signal and passes a mixer output signal to the signal filter 84. The signal filter 84 filters the unwanted products from the mixer output signal and passes an intermediate signal to the phase lock loop circuitry 88. The phase lock loop circuitry 88 provides an error signal to control the phase and frequency of the LO signal provided by the NCO 86 to phase lock to one of the standard and the offset DGPS signal.

The executable code in the microprocessor system 78 includes a data integrity code 94 for monitoring and providing an indication of the integrity of the data in the tuner output signal and a selection code 96 for instructing the microprocessor system 78 for reading the data integrity indication and controlling the tuner 76 for selecting the DGPS signal having the highest integrity. The data integrity code 94 may include a code for detecting and/or correcting errors in the data in the tuner output signal using redundant parity bits included in the transmitted data streams. The selection code 96 instructs the microprocessor system 78 to control the phase lock loop circuitry 88 to select the standard or the offset DGPS signal by controlling the NCO 86 to provide a frequency of the LO signal that places the product signal in the band of the signal filter 84. In a preferred embodiment, the selection code 94 includes instructions to microprocessor system 78 as follows: (i) to control the tuner 76 to phase lock to the standard DGPS signal; ii) to measure a data integrity indication of the standard DGPS signal; iii) to control the tuner 76 to phase lock to the offset DGPS signal; iv) to measure the data integrity indication of the offset DGPS signal; and v) to control the tuner 76 to phase lock to the strongest DGPS signal. Alternatively, the selection code 96 includes instructions to time share between the standard and the offset DGPS signals for demodulating and recovering the DGPS corrections.

The optional signal strength detector 90 provides an indication of the signal strength of the DGPS signal. The selection code 96 instructs the microprocessor system 78 to read the signal strength indication and to select the DGPS signal having the highest signal strength. The strongest DGPS signal is then demodulated by the demodulator 92 for recovering the DGPS corrections.

The microprocessor system 78 passes the DGPS corrections in an output signal to the GPS receiver 34. The GPS receiver 34, including the GPS antenna for receiving a GPS satellite signal, uses the DGPS corrections for calculating a differentially corrected GPS-based geographical location of the GPS antenna.

The FIG. 3b illustrates an embodiment of the DGPS beacon receiver 14 wherein the tuner 76 is a dual channel receiver including two mixers 82a and 82b, two signal filters 84a and 84b, two NCOs 86a and 86b, two phase lock loop circuitry's 88a and 88b, an optional signal strength detector 90', and two demodulators 92a and 92b. The NCO 86a provides a first LO signal to the mixer 82a and a second LO signal to the mixer 82b. The mixer 82a multiplies the standard digital DGPS signal with the first LO signal and passes a first mixer output signal to the signal filter 84a. The signal filter 84a filters the unwanted products from the first mixer output signal and passes a first intermediate signal to the phase lock loop circuitry 88a and the demodulator 92a. The phase lock loop circuitry 88a provides an error signal to control the phase and frequency of the first LO signal provided by the NCO 86a to phase lock to the standard DGPS signal. The first intermediate signal is demodulated by the demodulator 92a for recovering the DGPS corrections from the standard DGPS signal. Similarly, the mixer 82b multiplies the offset digital DGPS signal with the second LO signal and passes a second mixer output signal to the signal filter 84b. The signal filter 84b filters the unwanted products from the second mixer output signal and passes a second intermediate signal to the phase lock loop circuitry 88b and the demodulator 92b. The phase lock loop circuitry 88b provides an error signal to control the phase and frequency of the second LO signal provided by the NCO 86b to phase lock to the offset DGPS signal. The second intermediate signal is demodulated by the demodulator 92b for recovering the DGPS corrections from the offset DGPS signal.

The executable code in the microprocessor system 78 includes a data integrity code 94' for monitoring and providing an indication of the integrity of the data in the tuner output signal and a selection code 96 for instructing the microprocessor system 78 for reading the data integrity indication and selecting the DGPS signal having the highest integrity. The data integrity code 94' may include a code for detecting and/or correcting errors in the data in the tuner output signal. Optionally, the microprocessor system 78 reads a signal strength indication provided by the signal strength indicator 90' and selects the DGPS corrections corresponding to the strongest DGPS signal.

The microprocessor system 78 passes the DGPS corrections in an output signal to the GPS receiver 34. The GPS receiver 34, including the GPS antenna for receiving a GPS satellite signal, uses the DGPS corrections for calculating a differentially corrected GPS-based geographical location of the GPS antenna.

The FIG. 3c illustrates an embodiment of the DGPS beacon receiver 14 wherein the tuner 76 is a hybrid of a single and a dual channel receiver. The tuner 76 includes two mixers 82a and 82b, two signal filter 84a and 84b, a numerically controlled oscillator (NCO) 86", phase lock loop circuitry 88", a combiner 98, and a demodulator 92". The NCO 86" provides a first LO signal to the mixer 82a and a second LO signal to the mixer 82b. The mixer 82a multiplies the standard digital DGPS signal with the first LO signal and passes a first mixer output signal to the signal filter 84a. Similarly, the mixer 82b multiplies the offset digital DGPS signal with the second LO signal and passes a second mixer output signal to the signal filter 84b. The signal filters 84a and 84b filter the unwanted products from the mixer output signals and pass first and second intermediate signals, respectively, to the combiner 98. The first and second intermediate signals have an intermediate frequency (IF). The combiner 98 linearly sums the first and second intermediate signals and passes a combined intermediate signal to the phase lock loop circuitry 88". The phase lock loop circuitry 88" provides error signals to control the phase and frequency of the first and second LO signals provided by the NCO 86" to phase lock to each of the standard and offset DGPS signal. The combined intermediate signal is then demodulated by the demodulator 92" for recovering the DGPS corrections.

The executable code in the microprocessor system 78 may include a data integrity code 94" for monitoring, detecting, and/or correcting errors in the data stream in the tuner output signal. The microprocessor system 78 passes the DGPS corrections in an output signal to the GPS receiver 34. The GPS receiver 34, including the GPS antenna for receiving a GPS satellite signal, uses the DGPS corrections for calculating a differentially corrected GPS-based geographical location of the GPS antenna.

FIG. 4 illustrates a chart of relative delay in microseconds between the skywave 24 and the groundwave 20 versus the range between the DGPS beacon transmitter 12 and the DGPS beacon receiver 14 in kilometers with ionospheric height in kilometers as a parameter. The frequency offset between the standard DGPS signal and the offset DGPS signal is calculated using a selected range and an expected ionospheric height to find a relative delay. The relative delay is then used in an equation 1 shown below to find the frequency offset.

$$\text{frequency offset} = \frac{1}{\text{relative delay} \times 2} \quad (1)$$

For example, where it is desired to optimize performance at a range of about 300 kilometers and the ionospheric height is expected to be about 90 kilometers, the relative delay is approximately 170 microseconds. Using the equation 1 the frequency offset is then calculated to be approximately 2.9 kilohertz.

The frequency offset is chosen so that the range distances 28 and 30 (FIG. 1b) for the destructive interference nulls are not coincident over the selected range for extended operation. In the present invention, the destructive interference nulls for the two carrier frequencies may coincide at shorter ranges, for example 0 to 150 kilometers. However, at these ranges, the amplitude of the skywave 24 is weak relative to the groundwave 20 and the destructive interference nulls will be shallow. The present invention may also allow the destructive interference nulls to coincide at very long ranges, for example ranges greater than 600 kilometers. However, at these ranges operation may be unreliable in any case because the groundwave 20 is weak compared to background noise. Moreover the DGPS corrections themselves are losing their validity at ranges greater than 600 kilometers.

Importantly, a single frequency offset, such as the frequency offset of 2.9 kilohertz in the example above, will provide good reliability as the selected range varies from 150 to 600 kilometers and the ionospheric height varies from 70 to 110 kilometers. A 0 degree phase difference between the standard and offset DGPS signals results in the ranges distances 28 and 30 of the destructive interference nulls coinciding (worst condition) and a phase difference between 70 and 290 degrees results in adequate staggering of the interference nulls for operation even when the groundwave 20 and skywave 24 have approximately the same signal level. In the example above, the frequency offset of 2.9 kilohertz results in about 180 degree phase difference between the phase difference between the groundwave 20 and the skywave 24 of the standard DGPS signal and the phase difference between the groundwave 20 and the skywave 24 of the offset DGPS signal for a range of 300 kilometers when the ionosphere is 90 kilometers high. When the range varies from 150 to 600 kilometers and the ionospheric height varies from 70 to 90 kilometers, the frequency offset of 2.9 kilohertz results in phase differences between approximately 70 and 280 degrees, thereby ensuring that the destructive interference nulls continue to be adequately staggered over the extended range of 150 to 600 kilometers. Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for obviating destructive interference between a groundwave and a skywave of a signal, comprising steps of:

transmitting a first signal having a first carrier frequency propagating from a transmitter as a first signal groundwave and a first signal skywave;

transmitting a second signal having a second carrier frequency having a frequency offset from said first carrier frequency, said second carrier frequency propagating from said transmitter as a second signal groundwave and a second signal skywave; and using an ionospheric height for calculating said frequency offset for staggering first distances where destructive interference of said first signal groundwave and said first signal skywave occur from second distances where destructive interference between said second signal groundwave and said second signal skywave occur.

2. The method of claim 1, wherein:

the step of calculating said frequency offset includes a step of calculating said frequency offset for extending a range where said first and said second distances are staggered, said range beginning from said transmitter and continuous through an extended range.

3. The method of claim 2, wherein:

said frequency offset is approximately 2.9 kilohertz for providing said extended range for covering approximately between 150 and 600 kilometers from said transmitter.

4. The method of claim 1, wherein:

the step of calculating said frequency offset includes calculating said ionospheric height based upon a time of day.

5. The method of claim 1, wherein:

the step of transmitting said first signal includes a step of transmitting differential global positioning (DGPS) corrections with said first signal; and the step of transmitting said second signal includes a step of transmitting said DGPS corrections with said second signal.

6. The method of claim 5, further including steps of:

receiving a GPS satellite signal in a GPS receiver having a GPS antenna; and calculating said DGPS corrections based upon a difference between a known location of said GPS antenna and a GPS-derived location of said GPS antenna determined from information in said GPS satellite signal.

7. The method of claim 1, wherein:

said first signal includes a first DGPS beacon signal; and said second signal includes a second DGPS beacon signal.

8. The method of claim 7, wherein:

said first DGPS beacon signal is a standard DGPS beacon signal.

9. A transmitter station for transmitting at least two signals for obviating destructive interference between a groundwave and a skywave of a signal for extending a selected range from the transmitter station, comprising:

a transmitter for transmitting a first signal and a second signal, said first signal propagating as a first signal groundwave and a first signal skywave and said second signal propagating as a second signal groundwave and a second signal skywave;

a first signal generator connected to the transmitter for providing said first signal having a first carrier frequency; and a second signal generator connected to the transmitter for providing said second signal having a second carrier frequency differing from said first signal carrier frequency by a frequency offset, said frequency offset calculated from an ionospheric height for staggering first distances where destructive interference of said first signal groundwave and said first signal skywave occurs from second distances where destructive interference between said second signal groundwave and said second signal skywave occurs.

10. The transmitter station of claim 9, further including:

calculation means for calculating said ionospheric height and said frequency offset.

11. The transmitter station of claim 10, wherein:

the calculation means includes means for calculating said ionospheric height and said frequency offset based upon a time of day.

12. The transmitter station of claim 9, wherein:

said first signal includes differential global positioning (DGPS) corrections; and said second signal includes said DGPS corrections.

13. The transmitter station of claim 12, further including:

a DGPS reference receiver having a known location for receiving a GPS satellite signal and providing said DGPS corrections.

14. The transmitter station of claim 9, wherein:

said first signal includes a first DGPS beacon signal; and said second signal includes a second DGPS beacon signal.

15. The transmitter station of claim 14, wherein:

said first DGPS beacon signal is a standard DGPS beacon signal.

16. The transmitter station of claim 9, wherein:

said frequency offset is approximately 2.9 kilohertz for extending said selected range for covering approximately between 150 to 600 kilometers from the transmitter station.

17. A method for obviating destructive interference by receiving a multi-tone signal, comprising steps of:

receiving a first signal having information modulated onto a first carrier frequency, said first signal propagating from a transmitter as a first signal groundwave and a first signal skywave;

receiving a second signal having said information modulated onto a second carrier frequency, said second signal propagating from said transmitter as a second signal groundwave and a second signal skywave, said second carrier frequency differing from said first carrier frequency by a frequency offset calculated from an ionospheric height for staggering first distances from said transmitter where destructive interference of said first signal groundwave and said first signal skywave occur from second distances where destructive interference between said second signal groundwave and said second signal skywave occur; and processing said first and said second signals for recovering said information from at least one of said first signal and said second signal.

18. The method of claim 17, wherein:

the step of processing said first and said second signals includes steps of: measuring a signal strength for said first signal; measuring a signal strength for said second signal; selecting a strongest of said first and said second signal; and demodulating said strongest signal.

19. The method of claim 17, wherein:

the step of processing said first and said second signals includes steps of: measuring data integrity for said first signal; measuring data integrity for said second signal; selecting from said first and second signals a signal having a best data integrity; and demodulating said signal having said best data integrity.

20. The method of claim 17, wherein:

the step of processing said first and said second signals includes steps of: converting said first signal to a first intermediate signal having an intermediate frequency; converting said second signal to a second intermediate signal having said intermediate frequency; combining said first and said second intermediate signals; and demodulating said combined signal.

21. The method of claim 17, wherein:

the step of processing said first and said second signals includes a step of: alternately demodulating said first signal and said second signals.

22. The method of claim 17, wherein:

said information includes differential global positioning (DGPS) corrections.

23. The method of claim 22, wherein:

the step of processing said first and said second signals includes steps of: tuning a phase loop to a first frequency corresponding to said first carrier frequency; determining a signal strength of said first signal; tuning a phase lock loop to a second frequency corresponding to said second carrier frequency; determining a signal strength of said second signal; selecting a strongest of said first and said second signals; and recovering said differential global positioning system (DGPS) corrections from said strongest signal.

24. The method of claim 22, wherein:

the step of processing said first and said second signals includes steps of: tuning a phase loop to a first frequency corresponding to said first carrier frequency; determining a data integrity of said first signal; tuning a phase lock loop to a second frequency corresponding to said second carrier frequency; determining a data integrity of said second signal; selecting a signal from said first and said second signals having a best data integrity; and recovering said differential global positioning system (DGPS) corrections from said signal having said best data integrity.

25. The method of claim 22, further including the steps of:

receiving a GPS satellite signal in a GPS receiver having a GPS antenna; and calculating a differentially corrected GPS-based location of said GPS antenna by correcting information in said GPS satellite signal with said DGPS corrections.

26. The method of claim 17, wherein:

said first signal includes a first DGPS beacon signal; and said second signal includes a second DGPS beacon signal.

27. The method of claim 26, wherein:

said first DGPS beacon signal is a standard DGPS beacon signal.

28. A receiver for obviating destructive interference by receiving a multi-tone signal, comprising:

a first tuner for tuning to a first signal having information modulated onto a first carrier frequency propagating from a transmitter as a first signal groundwave and a first signal skywave;

a second tuner for tuning to a second signal having said information modulated onto a second carrier frequency propagating from said transmitter as a second signal groundwave and a second signal skywave, said second carrier frequency and said first carrier frequency having a frequency offset calculated from an ionospheric height for extending the range where destructive interference of said first signal groundwave and said first signal skywave and destructive interference between said second signal groundwave and said second signal skywave do not simultaneously occur; and selection means coupled to the first and second tuners for selecting at least one of said first and said second signals for recovering said information.

29. The receiver of claim 28, wherein:

the selection means includes a signal strength detector for measuring a signal strength representative of each of said first and said second signal and means for selecting a strongest of said first and second signals for recovering said information.

30. The receiver of claim 28, wherein:

the selection means includes a data integrity code for measuring a data integrity representative of each of said first and said second signal and means for selecting one of said first and second signals having a best data integrity for recovering said information.

31. The receiver of claim 28, wherein:

the selection means includes a combiner for receiving a first intermediate signal representative of said first signal and a second intermediate signal representative of said second signal and providing a combination of said first and said second intermediate signals in a combined signal for recovering said information.

32. The receiver of claim 28, wherein:

the selection means includes means for alternating between said first and second signals for recovering said information.

33. The receiver of claim 28, wherein:

said information includes DGPS corrections.

34. The receiver of claim 33, further including:

a GPS receiver including a GPS antenna for receiving a GPS satellite signal coupled for receiving said DGPS corrections and providing a differentially corrected GPS-based location of said GPS antenna.

35. The receiver of claim 28, wherein:

said first signal includes a DGPS beacon signal; and said second signal includes a DGPS beacon signal.

36. The receiver of claim 35, wherein:

said first DGPS beacon signal includes a standard DGPS beacon signal.

* * * * *